(12) United States Patent
Lundmark et al.

(10) Patent No.: US 10,501,573 B2
(45) Date of Patent: Dec. 10, 2019

(54) RADIATION CURING COMPOSITION

(71) Applicant: PERSTORP AB, Perstorp (SE)

(72) Inventors: Stefan Lundmark, Farhult (SE); Pia Wennerberg, Lund (SE)

(73) Assignee: PERSTORP AB, Perstorp (SE)

( * ) Notice: Subject to any disclaimer, the term of this patent is extended or adjusted under 35 U.S.C. 154(b) by 0 days.

(21) Appl. No.: 16/073,113

(22) PCT Filed: Dec. 30, 2016

(86) PCT No.: PCT/SE2016/000077
§ 371 (c)(1),
(2) Date: Jul. 26, 2018

(87) PCT Pub. No.: WO2017/131563
PCT Pub. Date: Aug. 3, 2017

(65) Prior Publication Data
US 2019/0048132 A1  Feb. 14, 2019

(30) Foreign Application Priority Data

Jan. 28, 2016 (SE) ...................................... 1600025

(51) Int. Cl.
| | |
|---|---|
| *C08F 2/46* | (2006.01) |
| *C08F 2/50* | (2006.01) |
| *C08G 61/04* | (2006.01) |
| *C08G 63/13* | (2006.01) |
| *C08F 218/02* | (2006.01) |
| *C08F 220/04* | (2006.01) |
| *C08F 220/10* | (2006.01) |
| *C09D 4/00* | (2006.01) |
| *C09D 131/02* | (2006.01) |
| *C09J 131/02* | (2006.01) |
| *C08G 63/08* | (2006.01) |
| *C08G 63/52* | (2006.01) |
| *C08G 63/78* | (2006.01) |
| *C08K 3/30* | (2006.01) |
| *C08K 5/1515* | (2006.01) |
| *C08K 5/1545* | (2006.01) |

(52) U.S. Cl.
CPC ............ *C08G 63/13* (2013.01); *C08F 218/02* (2013.01); *C08F 220/04* (2013.01); *C08F 220/10* (2013.01); *C08G 63/08* (2013.01); *C08G 63/52* (2013.01); *C08G 63/78* (2013.01); *C09D 4/00* (2013.01); *C09D 131/02* (2013.01); *C09J 131/02* (2013.01); *C08K 3/30* (2013.01); *C08K 5/1515* (2013.01); *C08K 5/1545* (2013.01)

(58) Field of Classification Search
CPC ........ C08G 63/13; C08G 63/78; C08G 63/08; C08G 63/52; C09J 131/02; C08K 3/30; C08K 5/1545; C08K 5/1515; C09D 4/00; C09D 131/02; C08F 220/04; C08F 214/00; C08F 218/02; C08F 216/06; C08F 220/10; C08F 220/12
USPC ................ 522/6, 71, 189, 184, 1; 520/1
See application file for complete search history.

(56) References Cited

U.S. PATENT DOCUMENTS

| | | | |
|---|---|---|---|
| 2,671,064 A * | 3/1954 | Cowell | .................. C08K 5/098 524/114 |
| 3,562,095 A | 2/1971 | Rahl et al. | |
| 3,926,873 A | 12/1975 | Aishima et al. | |
| 4,016,196 A | 4/1977 | Kogure et al. | |
| 2002/0136769 A1 | 9/2002 | Kabanov et al. | |
| 2004/0228823 A1 | 11/2004 | Bronich et al. | |
| 2010/0121096 A1 | 5/2010 | Taarning et al. | |

OTHER PUBLICATIONS

International Search Report and Written Opinion dated Mar. 16, 2017 in corresponding PCT Application No. PCT/SE2016/000077.

* cited by examiner

*Primary Examiner* — Jessica Whiteley
(74) *Attorney, Agent, or Firm* — Polsinelli PC

(57) ABSTRACT

Disclosed is a radiation curable composition comprising 2-hydroxy-3-butenoic acid and/or at least one ester of 2-hydroxy-3-butenoic acid and at least one additional compound selected from radiation curable monomers, oligomers and polymers.

20 Claims, No Drawings

RADIATION CURING COMPOSITION

CROSS-REFERENCT TO RELATED APPLICATIONS

This application is a national stage application (under 35 U.S.C. § 371) of PCT/SE2016/000077, filed Dec. 30, 2016, which claims benefit of Swedish Application No. 1600025-9, filed Jan. 28, 2016, which are incorporated herein by reference in their entireties.

The present invention refers to a novel radiation curable composition comprising 2-hydroxy-3-butenoic acid and/or at least one ester of 2-hydroxy-3-butenoic acid and at least one additional compound selected from radiation curable monomers, oligomers and polymers.

Chemical compounds having one or more carbon-carbon double bonds (unsaturations) are well known in the art and used as reactants and chemical building blocks in a wide variety of applications, such as drying and/or heat curing and/or UV, IR and EB curing paints, enamels, putties, lacquers, varnishes, adhesives and inks, esters and polyesters, latex, fibres, textiles and so on, as well as in for instance moulding and casting compositions and the like. There is, however, despite the large amount of commercially available unsaturated compounds and derivatives thereof, due to for instance environmental concerns and legislation and/or new application areas, a substantial and ever growing demand for novel, safer, more efficient and/or more versatile compounds having one or more carbon-carbon double bonds. A major search, for safer unsaturated compounds for use in polymeric materials, is directed to suitable replacements for presently used unsaturated compounds, such as acrylic and allylic compounds.

An object of the present invention is to provide a novel unsaturated compound having at least one carbon-carbon double bond. A further object is to provide a suitable, complement and/or replacement for compounds such as acrylic, methacrylic and crotonic ester, allyl and methallyl ethers, and other compounds comprising at least one vinyl unsaturation. Yet a further object is to provide a said suitable complement and/or replacement obtained from a renewable source, such as a biomass.

It has now quite unexpectedly been found that 2-hydroxy-3-butenoic acid and its esters provide excellent radiation curing compositions, wherein said acid and/or said ester is used as complement to or substitute for radiation curable compounds having for instance one or more carbon-carbon double bonds, such as acrylic, methacrylic and crotonic esters, allyl or methallyl ethers, and/or compounds such as vinyl monomers, oligomers and polymers. 2-Hydroxy-3-butenoic acid and its methyl ester, methyl vinyl glycolate, are easily obtained from biomass via for instance lactic acid. Said 2-hydroxy-3-butenoic acid and said methyl vinyl glycolate can easily via esterification or transesterification with mono, di, tri and polyalcohols, be transformed to a number of versatile compounds having one or more vinyl unsaturations.

Embodiments of the present invention accordingly include compositions wherein at least one of the included components is 2-hydroxy-3-butenoic acid or an ester of 2-hydroxy-3-butenoic acid. Said ester is in various embodiments a linear or branched alkyl ester, such as methyl or ethyl vinyl glycolate, or an ester of 2-hydroxy-3-butenoic acid and a monoalcohol, such as 2-ethyl-heptanol, 2-propyl-heptanol, 5-hydroxy-1,3-dioxane, 5-hydroxymethyl-1,3-dioxane or 5-hydroxyethyl-1,3-dioxane. Further embodiments include esters of 2-hydroxy-3-butenoic acid and di, tri or polyhydroxy functional compounds, such as diols, triols, tetrols, pentols, hexols and hyperbranched dendritic polyols. These embodiments accordingly include esters, such as mono and diesters of diols, mono, di and triesters of triols, mono, di, tri and tetraesters of tetrols, mono, di, tri, tetra and pentaesters of pentols, and mono, di, tri, tetra, penta and hexaesters of hexols as well as mono, oligo or polyesters of hydroxyfunctional compounds having seven or more hydroxyl groups.

Said additional compound is in embodiments of the present invention at least one acrylic, methacylic or crotonic ester having at least one carbon-carbon double bond, such as acrylic, methacrylic or crotonic mono and diesters of diols, mono, di and triesters of triols, mono, di, tri and tetraesters of tetrols, mono, di, tri, tetra and pentaesters of pentols, mono, di, tri, tetra, penta hexaesters of hexols and mono, di (oligo) or polyesters of hyperbranched dendritic polyols and hydroxyfunctional compounds having seven or more hydroxyl groups, and/or is at least one allyl or methallyl ether having at least one carbon-carbon double bond, such as mono and diethers of diols, mono, di and triethers of triols, mono, di, tri and tetraethers of tetrols, mono, di, tri, tetra and pentaethers of pentols, mono, di, tri, tetra, penta hexaethers of hexols and mono, di or polyethers of di (oligo) or polyesters of hyperbranched dendritic polyols and hydroxyfunctional compounds having seven or more hydroxyl groups.

Embodiments of said diol include, but are not limited to, compounds of formula HO—R—OH, wherein R is a linear or branched alkyl, cycloalkyl or aryl group, and can suitably be exemplified by butanediol, propanediol, heptanediol, pentanediol, hexanediol, dipropylene glycol, triethylene glycol, cyclohexanedimethanol, 2-ethyl-2-butyl-1,3-propanediol, neopentyl glycol, 5,5-dihydroxymethyl-1,3-dioxane, xylylene glycol (benzene dimethanol), pentaerythitol spiroglycol and by caprolactone diols and/or by a to a said diol corresponding polycarbonate diol. Further suitable embodiments of said diol include alkoxylated, such as ethoxylated, propoxylated and/or butoxylated, neopentyl glycol, 5,5-dihydroxymethyl-1,3-dioxane, xylylene glycol and pentaerythitol spiroglycol having an alkoxylation degree of for instance 1-20 alkoxy units/molecule. Yet further suitable embodiments of said diol include compounds such as bisphenol A and bisphenol F as well as alkoxylated, such as ethoxylated, propoxylated and/or butoxylated, species thereof having an alkoxylation degree as previously said.

Embodiments of said triol can be exemplified by, but not limited to, glycerol, trimethylolethane, trimethylolpropane, trimethylolbutane, xylylene triol (benzene trimethanol), caprolactone triols, to a said triol corresponding polycarbonate triols as well as alkoxylated, such as ethoxylated, propoxylated and/or butoxylated, glycerol, trimethylolethane, trimethylolpropane, trimethylolbutane or xylylene triol (benzene trimethanol) having an alkoxylation degree of for instance 1-20 alkoxy units/molecule.

Embodiments of said tetrol can be exemplified by, but not limited to, pentaerythritol, di-trimethylolethane, di-trimethylolpropane, ditrimethylolbutane, caprolactone tetrols, to a said tetrol corresponding polycarbonate tetrols as well as by alkoxylated, such as ethoxylated, propoxylated and/or butoxylated, pentaerythritol, di-trimethylolethane, di-trimethylolpropane and ditrimethylolbutane having an alkoxylation degree of for instance 1-20 alkoxy units/molecule.

Embodiments of said pentol can be exemplified by, but not limited to, anhydroenneaheptitol, xylitol, caprolactone pentols, to a said pentol corresponding polycarbonate pentols as well as alkoxylated, such as ethoxylated, propoxylated and/or butoxylated, anhydroenneaheptitol or xylitol having an alkoxylation degree of for instance 1-20 alkoxy units/molecule.

Embodiments of said hexol can be exemplified by, but not limited to, di-pentaerythritol, sorbitol, mannitol, caprolactone hexols, to a said hexol corresponding polycarbonate hexols as well as alkoxylated, such as ethoxylated, propoxylated and/or butoxylated, dipentaerythritol, sorbitol or mannitol having an alkoxylation degree of for instance 1-20 alkoxy units/molecule.

In embodiments of the present invention, said composition suitably and additionally comprises at least one epoxy (meth)acrylate, amine modified epoxy (meth)acrylate, urethane (meth)acrylate, bisphenol A (meth)acrylate, polyester (meth)acrylate, polyether (meth)acrylate, amine modified polyether (meth)acrylate, acid functional (meth)acrylate, lauryl(meth)acrylate, nonylphenol (meth)acrylate, alkoxylated, such as ethoxylated, propoxylated and/or butoxylated, nonylphenol (meth)acrylate, oxetane(meth)acrylate, cyano (meth)acrylate and/or tetrahydrofurfuryl (meth)acrylate.

In further embodiment of the present invention, said composition may suitably and additionally comprise at least one vinyl monomer, oligomer or polymer such as, but not limited to vinylpyrrolidones, polyolefins, including polyethylenes, polypropylenes and polybutadienes, styrenes including polystyrenes, vinyl halides, including polyvinyl chlorides and fluorides, vinyl acetates including polyvinyl acetates, vinyl alcohols including polyvinyl alcohols, and acrylonitriles including polyacrylonitriles.

In yet further embodiments of the present invention, said composition is a UV, IR and EB curable composition and can optionally and additionally comprise at least one matting agent, flow/levelling agent, rheology modifying agent, dye and/or pigment.

The composition of the present invention is in especially preferred embodiments a UV curable composition which additionally comprises at least one photoinitiator such as at least one free radical, cation and/or anion photoinitiator. Suitable photoinitiator can be exemplified by, but not limited to, sulphonium antimonates, such as triarylsulphonium hexaantimonate, sulphonium fluoroantimonates, sulphonium fluorophosphates, such as triarylsulphonium hexafluorophosphate, sulphonium nitrates, sulphonium triflates, iodonium fluorophophates, such as dimetyl-diphenyl iodonium hexafluorophosphate, hydroxy(cyclo)alkylaryl ketones, such as hydroxycyclohexylphenyl ketones, metallocenes, such as ferrocenes, rhutenocennes and titanocenes, ketoprofens, benzoin ethers, benzil ketals, benzophenones, acetophenones, aminoalkylphenones, acylphosphine oxides, benzoephenones, thixantones, anthraquinones and/or camphorquinones.

In a further aspect, the present invention refers to the use of a composition as disclosed above in coatings, including haptic coatings, for wood, metal, plastics, textiles and paper, flexo and digital inks, 3D printing, graphic arts, adhesives, medical and dental applications and devices, absorbents, sanitary articles, packaging, electronic and electric applications and devices, and/or optical application and devices. In yet a further aspect, the present invention refers to the use of 2-hydroxy-3-butenoic acid or methyl or ethyl vinyl glycolate acid as reactive diluent in a radiation curing composition.

Without further elaboration, it is believed that one skilled in the art can, using the preceding description, utilise the present invention to its fullest extent. The following preferred specific embodiments are, therefore, to be construed as merely illustrative and not limitative in any way whatsoever. In the following Examples shows that the 2-hydroxy-3-butenoic acid ester methyl vinyl glycolate, unexpectedly and despite having only one carbon-carbon double, UV cures and Example 2 shows that said ester in combination with a second UV curable compound give excellent curing and excellent film properties.

EXAMPLE 1

96 parts by weight of methyl vinyl glycolate was mixed with 4 parts by weight of the photoinitiator Irgacure® 500 (Ciba Specialty Chemicals) and UV cured 30*5 m/min H-bulb set at 100% with a film thickness of 40 µm on glass panels.

The following harness properties were obtained:

| König hardness, 1 hr. | 70 könig secs. |
| König hardness, 24 hrs. | 74 könig secs. |
| König hardness, 1 week | 62 könig secs. |

Used equipment gave UV dose J/cm$^2$ H-bulb set at 100%:

| UV-A | UV-B | UV-C | UV-V |
| --- | --- | --- | --- |
| 26.7 | 23.46 | 5.25 | 28.38 |

EXAMPLE 2

50 parts by weight of methyl vinyl glycolate was mixed with 46 parts by weight of hexanediol diacrylate and 4 parts by weight of the photoinitiator Irgacure® 500 (Ciba Specialty Chemicals) and UV cured 20*5 m/min H-bulb set at 100% with a film thickness of 40 µm on glass panels.

The following hardness properties were obtained:

| König hardness, 1 hr. | 170 könig secs. |
| König hardness, 24 hrs. | 181 könig secs. |
| König hardness, 1 week | 200 könig secs. |

Used equipment gave UV dose, J/cm$^2$ H-bulb set at 100%:

| UV-A | UV-B | UV-C | UV-V |
| --- | --- | --- | --- |
| 17.8 | 15.64 | 3.7 | 18.92 |

The invention claimed is:

1. A radiation curable composition characterised in that it comprises 2-hydroxy-3-butenoic acid and/or at least one ester of 2-hydroxy-3-butenoic acid and at least one additional compound selected from radiation curable monomers, oligomers and polymers.

2. A composition according to claim 1 characterised in that said ester of 2-hydroxy-3-butenoic acid is a methyl or ethyl ester.

3. A composition according to claim 2 characterised in that said methyl or ethyl ester is methyl vinyl glycolate or ethyl vinyl glycolate.

4. A composition according to claim 1 characterised in that said ester of 2-hydroxy-3-butenoic acid is an ester with 2-ethyl-heptanol, 2-propyl-heptanol, 5-hydroxy-1,3-dioxane, 5-hydroxymethyl-1,3-dioxane, or 5-hydroxyethyl-1,3-dioxane.

5. A composition according to claim 1 characterised in that said ester of 2-hydroxy-3-butenoic acid is an ester with a hyperbranched dendritic polyol.

6. A composition according to claim 1 characterised in that said ester of 2-hydroxy-3-butenoic acid is a mono or diester of a diol, a mono, di or triester of a triol, a mono, di, tri or tetraester of a tetrol, a mono, di, tri, tetra or pentaester of a pentol or a mono, di, tri, tetra, penta or hexaester of a hexol.

7. A composition according to claim 1 characterised in that said additional compound is at least one acrylic, methacylic or crotonic ester having at least one carbon-carbon double bond.

8. A composition according to claim 7 characterised in that said acrylic, methacrylic or crotonic ester is an ester with a hyperbranched dendritic polyol.

9. A composition according to claim 7 characterised in that said acrylic, methacrylic or crotonic ester is a mono or diester of a diol, a mono, di or triester of a triol, a mono, di, tri or tetraester of a tetrol, a mono, di, tri, tetra or pentaester of a pentol or a mono, di, tri, tetra, penta or hexaester of a hexol.

10. A composition according to claim 1 characterised in that said additional compound is at least one allyl or methallyl ether having at least one carbon-carbon double bond.

11. A composition according to claim 10 characterised in that said allyl or methallyl ether is an ether with a hyperbranched dendritic polyol.

12. A composition according to claim 10 characterised in that said allyl or methallyl ether is a mono or diether of a diol, a mono, di or triether of a triol, a mono, di, tri or tetraether of a tetrol, a mono, di, tri, tetra or pentaether of a pentol or a mono, di, tri, tetra, penta or hexaether of a hexol.

13. A composition according to claim 1 characterised in that it additionally comprises at least one epoxy (meth)acrylate, amine modified epoxy (meth)acrylate, urethane (meth)acrylate, bisphenol A (meth)acrylate, polyester (meth)acrylate, polyether (meth)acrylate, amine modified polyether (meth)acrylate and/or acid functional (meth)acrylate.

14. A composition according to claim 1 characterised in that it additionally comprises lauryl(meth)acrylate, nonylphenol (meth)acrylate, and/or alkoxylated nonylphenol (meth)acrylate, oxetane(meth)acrylate, cyano(meth)acrylate and/or tetrahydrofurfuryl (meth)acrylate, wherein the alkoxylated nonylphenol (meth)acrylate, oxetane(meth)acrylate, cyano(meth)acrylate and/or tetrahydrofurfuryl (meth)acrylate are selected from ethoxylated, propoxylated, and butoxylated nonylphenol (meth)acrylate, oxetane(meth)acrylate, cyano(meth)acrylate and tetrahydrofurfuryl (meth)acrylate.

15. A composition according to claim 1 characterised in that it additionally comprise at least one vinyl monomer, oligomer or polymer, selected from vinylpyrrolidones, polyolefins, styrenes, vinyl halides, vinyl acetates, vinyl alcohols and acrylonitriles.

16. A composition according to claim 1 characterised in that it additionally comprises at least one matting agent, flow/levelling agent, rheology modifying agent, dye and/or pigment.

17. A composition according to claim 1 characterised in that it is a UV, IR and EB curable compositions.

18. A composition according to claim 1 characterised in that it is a UV curable composition which additionally comprises at least one photoinitiator.

19. A composition according to claim 18 characterised in that said photoinitiator is a free radical, cation or anion photoinitiator.

20. A composition according to claim 18 characterised in that said photoinitiator is a sulphonium antimonate, a sulphonium fluoroantimonate, a sulphonium fluorophosphate, a sulphonium nitrate, a sulphonium triflate, an iodonium fluorophophate, a hydroxy(cyclo)alkylaryl ketone, a metallocene, a ketoprofen, a benzoin ether, a benzil ketal, an acetophenone, a benzophenone, an amino(cyclo)alkylphenone, an acylphosphine oxide, a benzoephenone, a thixantone, an anthraquinone and/or a camphorquinone.

\* \* \* \* \*